United States Patent Office 3,672,904

Patented June 27, 1972

3,672,904

PHOTOTHERMOGRAPHIC ELEMENTS CONTAINING BIS-BETA-NAPHTHOLS

Richard A. de Mauriac, Rochester, N.Y., assignor to Eastman Kodak Company, Rochester, N.Y.

No Drawing. Filed May 1, 1970, Ser. No. 33,964

Int. Cl. G03c *1/02*

U.S. Cl. 96—114.1 14 Claims

ABSTRACT OF THE DISCLOSURE

A reducing agent, such as a bis-naphthol, in combination with an activator-toning agent, such as a cyclic imide, in a photosensitive and thermosensitive element suitable for dry processing with heat, provides improved pre-processing incubation stability, increased sensitivity including reduced exposure and processing time, more neutral maximum density areas and greater image stability. A combination of a bis-naphthol reducing agent and a cyclic-imide activator-toning agent in conjunction with a stable source of silver for physical development are useful in photosensitive elements for dry processing. The element can contain a sensitizing dye and a stable, developed image can be provided by heating the element after exposure. The photosensitive component can be photographic silver halide, or other suitable photosensitive metal salts.

BACKGROUND OF THE INVENTION

Field of the invention

This invention relates to photosensitive elements, compositions and processes for developing a latent image using so-called dry processing with heat. In one of its aspects, it relates to photosensitive elements suitable for dry processing with heat containing a bis-naphthol reducing agent, especially one containing a bis-$\beta$-naphthol reducing agent, and an activator-toning agent, especially one containing a cyclic imide. In another of its aspects, it relates to a photosensitive composition suitable for dry processing with heat containing a bis-naphthol reducing compound and an activator-toning agent as described. A further aspect relates to a dry process of developing and enhancing the maximum image density and tone in a photosensitive and thermosensitive element containing a bis-naphthol reducing agent and an activator-toning agent as described.

DESCRIPTION OF PRIOR ART

It is known to obtain an image in a thermographic non-silver halide element using a reducing agent in so-called dry processing with heat, the thermographic element can contain a reducing agent, such as 1,1'-dihydroxy-2,2'-binaphthyl and a light insensitive silver salt of an organic acid as well as a toning agent. For example, after U.V. irradiation of the copy sheet while in contact with the original, the resulting exposed element is developed by heating. Such an element is described in U.S. Pat. 3,094,-619 of Grant issued June 18, 1963. A similar element involving the use of $\alpha$- or $\beta$-naphthol as a reducing agent and 1-(2H)-phthalazinone as a toning agent is described, for example, in U.S. Pat. 3,080,254 of Grant issued Mar. 5, 1963.

Other methods of so-called dry processing with heat are described, for example, in U.S. Pat. 3,152,903 of Shepard et al. issued Oct. 13, 1964. For example, (1) an organic silver salt which is an oxidizing agent, (2) an organic reducing agent, (3) a catalyst such as zinc oxide or titanium dioxide and a toning agent are provided in a radiation-sensitive element, which is sensitive to irradiation below one micron. After imagewise exposure, the resulting latent image is developed by heating the element.

Another method of so-called dry processing with heat is described, for example, in U.S. Pat. 3,152,904 of Sorensen et al. issued Oct. 13, 1964. For example, (1) an organic silver salt which is an oxidizing agent, (2) an organic reducing agent and a low concentration of photographic silver halide are provided in an ultraviolet light-sensitive element. After imagewise exposure, the resulting latent image is developed by heating the element. Methods of this type are also described, for example, in French Pat. 1,441,619 and Belgian Pat. 705,872. Unfortunately, in some cases these elements suffer from having poor spectral sensitivity and the resulting images after processing are of low maximum density and contrast, have poor incubation stability and are of a warm tone. A representative example of the prior art is found in Example 4. Accordingly, there has been a continuing need for a photosensitive element suitable for so-called dry processing with heat which has improved pre-processing incubation stability, increased sensitivity including reduced exposure and processing time, more neutral maximum density areas and greater image stability.

SUMMARY OF THE INVENTION

The described improvements are provided in a photosensitive and thermosensitive element comprising a support, (a) An oxidation-reduction image-forming combination comprising (i) a bis-naphthol reducing agent and
(ii) a silver salt oxidizing agent, (b) A binder and (c) A catalyst for the described oxidation-reduction image-forming combination, as described herein. The photosensitive and thermosensitive element preferably contains an activator-toning agent, especially a cyclic imide, such as phthalimide or succinimide.

DETAILED DESCRIPTION OF THE INVENTION

A range of bis-naphthol reducing agents can be employed in the practice of the invention to provide a desired developed image. These can be employed in combination, if desired, with other reducing agents. Suitable organic reducing agents which can be employed in the described combination include, for example, substituted phenols and naphthols.

The bis-naphthol which is preferred is a bis-$\beta$-naphthol of the formula:

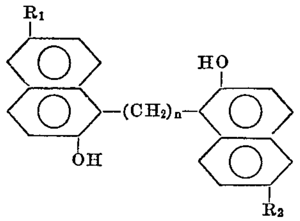

wherein $R_1$ and/or $R_2$ is hydrogen, alkyl with 1 to 3 carbon atoms, alkoxy, e.g. alkoxy ocntaining 1 to 2 carbon atoms, such as methoxy or ethoxy; halogen, nitro, amino, or a diazonium halide salt and *n* is 0 or 1.

An especially suitable bis-$\beta$-naphthol is 2,2'-dihydroxy-1,1'-binaphthyl of the formula

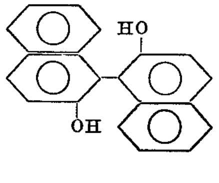

Other examples of suitable bis-β-naphthols which can be employed in the practice of the invention include:

6,6'-dibromo-2,2'-dihydroxy-1,1'-binaphthyl
6,6'-dinitro-2,2'-dihydroxy-1,1'-binaphthyl
bis-(2-hydroxy-1-naphthyl)methane.

The described reducing agents are suitable in a range of concentration; however, they are especially suitable, at a concentration from about 0.4 to 4.0 moles of reducing agent per mole of silver halide, according to the invention in an element as described. Photosensitive and thermosensitive elements which are suitable for dry processing with heat can provide a developed image by physical development, such as described in U.S. Pat. 3,457,075 of Morgan et al. issued July 22, 1969. Other elements of this type are described, for example, in U.S. Pat. 3,429,706 of Shepard et al. issued Feb. 25, 1969 and U.S. at. 3,152,-904 of Sorensen et al. issued Oct. 13, 1964.

Other reducing agents can be used in conjunction with the above bis-naphthol reducing agents. These are typically silver halide developing agents and include, for example, polyhydroxybenzenes such as hydroquinone developing agents, e.g., hydroquinone, alkyl-substituted hydroquinones as exemplified by tertiary butylhydroquinone, methylhydroquinone, 2,5 - dimethylhydroquinone and 2,6-dimethylhydroquinone; catechols and pyrogallol; halo-substituted hydroquinones such as chlorohydroquinone or dichlorohydroquinone; alkoxy-substituted hydroquinones such as methoxyhydroquinone or ethoxyhydroquinone; methyldroxynaphthalene; phenylenediamine developing agents; methylgallate; aminophenol developing agents, such as 2,4 - diaminophenols and methylaminophenols; ascorbic acid developing agents such as ascorbic acid, ascorbic acid ketals and ascorbic acid derivatives such as those described in U.S. Pat. 3,337,342 of Green issued Aug. 22, 1967; hydroxylamine developing agents such as N,N'-di(2-ethoxyethyl)hydroxylamine; 3-pyrazolidone developing agents such as 1-phenyl-3-pyrazolidone and 4-methyl-4-hydroxymethyl-1-phenyl-3-pyrazolidone including those described in British Pat. 930,572 published July 3, 1963; hydroxytetronic acid, and hydroxytetronimide developing agents; reductone developing agents such as anhydrodihydropyrrolidino hexose reductone; and the like.

It is desirable, as described, to employ an activator-toning agent in the elements, compositions and processes of the invention to obtain a more neutral (black) image, particularly when phenolic reducing agents are used. A suitable activator-toning agent is a heterocyclic activator-toning agent containing at least one nitrogen atom and of the formula:

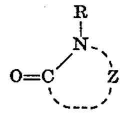

where R is hydrogen, hydroxyl, or a metal ion such as potassium, sodium, lithium, silver, gold or mercury; Z, represents atoms completing a heterocyclic nucleus, especially a 5 or 6 member heterocyclic nucleus. The atoms completing the heterocyclic nucleus can be, for example, $$-\underset{\underset{O}{\|}}{C}-CH_2-CH_2-$$

or an alkylene group containing 3 or 4 carbon atoms. The atoms completing the heterocyclic nucleus can contain various substituent groups, such as amino, alkyl amino, e.g. methylamino or ethylamino, hydroxyl, carbamyl and the like. An especially suitable activator-toning agent is a heterocyclic activator-toning agent containing at least one nitrogen atom which is preferably a cyclic-imide of the formula:

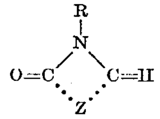

wherein R can be hydrogen, hydroxyl, or a metal ion such as potassium, sodium, lithium, silver, gold or mercury; Z represents carbon atoms of a series completing a cyclic-imide nucleus, typically consisting of from 5 to 6 carbon atoms, e.g. a phthalimide or succinimide nucleus. The atoms of the cyclic imide nucleus can contain various substituent groups, especially amino, alkyl, such as alkyl containing 1 to 5 carbon atoms, such as methyl, ethyl, propyl, butyl or pentyl or aryl, such as aryl containing 6 to 20 carbon atoms, such as phenyl, tolyl and xylyl.

An especially suitable activator-toning agent is phthalimide of the formula

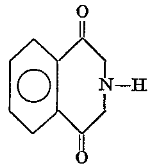

Examples of suitable cyclic-imides which can be employed in the practice of the invention include:

N-hydroxyphthalimide
N-potassium phthalimide
N-silver phthalimide
N-mercury phthalimide
succinimide
N-hydroxysuccinimide.

The described cyclic-imide activator-toning agents are suitable in a range of concentration; however, they are especially suitable at a concentration from about 1.0 to about 3.0 moles of activator-toning agent per mole of silver halide.

A so-called activator-toner can be employed in combination with other components of the described photosensitive and thermosensitive element in the practice of the invention. Various toners can be employed for this purpose. Typically a heterocyclic organic toning agent containing at least two hetero atoms in the heterocyclic ring of which at least one is a nitrogen atom is employed. These are described, for example, in U.S. Pat. 3,080,254 of Grant issued Mar. 5, 1963. Suitable toners include, for example, phthalazinone, phthalic anhydride, 2-acetylphthalazinone and 2 - phthalylphthalazinone. Other suitable toners are described, for example, in U.S. Pat. 3,446,648 of Workman issued May 27, 1969.

A non-aqueous, polar, organic solvent, such as a compound containing a $$-\overset{\overset{O}{\|}}{C}-,\ -\overset{\overset{O}{\|}}{S}-\ \text{or}\ -SO_2-$$

moiety, in a photosensitive and thermosensitive element suitable for dry processing with heat can provide improved maximum image densities.

Another method of amplifying a latent image comprises placing a radiation sensitive element such as a photopolymer containing an electrostatic latent image or a radiation sensitive element in which a colloidal metal or colloidal particles of metal sulfide nuclei are formed imagewise in a vacuum evaporator and evaporating a metal such as lead. Said latent image of colloidal metal or metal sulfide nuclei will catalyze the vacuum deposition of the lead on the radiation sensitive element making the aforementioned latent image visible.

The described elements can comprise a silver salt of an organic acid, as an oxidizing agent. The silver salt of the organic acid should be resistant to darkening under illumination to prevent undesired deterioration of a developed image. An especially suitable class of silver salts of organic acids is represented by the water insoluble silver salts of long-chain fatty acids which are stable to light. Compounds which are suitable silver salts include silver behenate, silver stearate, silver oleate, silver laurate, silver hydroxystearate, silver caprate, silver myristate, and silver palmitate. Other suitable oxidizing agents are silver benzoate, silver phthalazinone, silver benzotriazole, silver saccharin, silver 4′-n-octadecyloxydiphenyl-4-carboxylic acid, silver ortho-amino-benzoate, silver acetamidobenzoate, silver furoate, silver camphorate, silver p-phenylbenzoate, silver phenyl acetate, silver salicylate, silver butyrate, silver terephthalate, silver phthalate, silver acetate, and silver acid phthalate. Oxidizing agents which are not silver salts can be employed if desired, such as zinc oxide, gold stearate, mercuric behenate, auric behenate and the like, but silver salts are preferred.

The described element contains a catalyst for the described oxidation-reduction image forming combinations, especially a photosensitive salt, such as photosensitive silver salt. A typical concentration range of photosensitive silver salt is from about 0.01 to about 0.50 mole of photosensitive silver salt per mole of oxidizing agent, e.g. per mole of silver salt of organic acid, such as per mole of silver behenate. Preferred silver salts are photosensitive silver halides, e.g. silver chloride, silver bormide, silver bromoiodide, silver chlorobromoiodide, or mixtures thereof. The photosensitive silver halide can be coarse or fine-grain, very fine-grain emulsions being especially useful. The emulsion containing the photosensitive silver halide can be prepared by any of the well known procedures in the photographic art, such as single-jet emulsions, double-jet emulsions, such as Lippmann emulsions, ammoniacal emulsions, thiocyanate or thioether ripened emulsions, such as those described in U.S. Pat. 2,222,264 of Nietz et al. issued Nov. 14, 1940; U.S. Pat. 3,320,069 of Illingsworth issued May 15, 1967 and U.S. Pat. 3,271,157 of McBride issued Sept. 6, 1966. Surface image silver halide emulsions can be used. If desired, mixtures of surface and internal image silver halide emulsions can be used as described in U.S. Pat. 2,996,382 of Luckey et al. issued Apr. 15, 1961. Negative type emulsions can be used. The silver halide emulsion can be a regular grain emulsion such as described in Klein and Moisar, Journal of Photographic Science, volume 12, No. 5, September-October (1964) pp. 242–251.

The silver halide emulsions employed in the practice of the invention can be unwashed or washed to remove soluble salts. In the latter case the soluble salts can be removed by chill setting and leaching or the emulsion can be coagulation washed.

The silver halide employed in the practice of the invention can be sensitized with chemical sensitizers, such as with reducing agents; sulfur, selenium, or tellurium compounds; gold, platinum, or palladium compounds; or combinations of these. Suitable procedures are described, for example, in U.S. Pat. 1,623,499 of Shepard issued Apr. 5, 1927; U.S. Pat. 2,399,083 of Waller et al. issued Apr. 23, 1946; U.S. Pat. 3,297,447 of McVeigh issued Jan. 10, 1967; and U.S. Pat. 3,297,446 of Dunn issued Jan. 10, 1967.

Photosensitive silver halide emulsions employed in the practice of the invention can be protected against the production of fog and can be stabilized against loss of sensitivity during keeping. Suitable antifoggants and stabilizers, e.g. used alone or in combination include, for example, thiazonium salts; azaindenes; mercury salts as described for example, in U.S. Pat. 2,728,663 of Allen et al. issued Dec. 27, 1955; urazoles; sulfocatechols; oximes described, for example, in British Pat. 623,448; nitron; nitroindazoles; polyvalent metal salts described, for example, in U.S. Pat. 2,839,405 of Jones issued June 17, 1958; platinum, palladium and gold salts described, for example, in U.S. Pat. 2,566,263 of Trivelli et al. issued Aug. 28, 1951 and U.S. Pat. 2,597,915 of Yutzy et al. issued May 27, 1952.

A photosensitive and thermosensitive element and emulsions described and used in the practice of the invention can contain various colloids alone or in combination as vehicles, binding agents and in various layers. Suitable materials are typically hydrophobic but hydrophilic materials can also be employed. They are transparent or translucent and include both naturally-occurring substances such as proteins, for example, gelatin, gelatin derivatives, cellulose derivatives, polysaccharides such as dextran, gum arabic and the like; and synthetic polymeric substances such as water-soluble polyvinyl compounds like poly(vinyl pyrrolidone), acrylamide polymers and the like. Other synthetic polymeric compounds which can be employed include dispersed vinyl compounds such as in latex form and particularly those which increase dimensional stability of photographic materials. Suitable synthetic polymers include those described in U.S. Pat. 3,142,586 of Nottorf issued July 28, 1964; U.S. Pat. 3,193,386 of White issued July 6, 1955; U.S. Pat. 3,062,674 of Houck et al. issued Nov. 6, 1962; U.S. Pat. 3,220,844 of Houck et al. issued Nov. 30, 1965; U.S. Pat. 3,287,289 of Ream et al. issued Nov. 22, 1966; and U.S. Pat. 3,411,911 of Dykstra issued Nov. 19, 1968. Effective polymers include water insoluble polymers of alkyl acrylates and methacrylates, acrylic acid, sulfoalkyl acrylates or methacrylates, and those which have cross-linking sites which facilitate hardening or curing as well as those having recurring sulfobetaine units as described in Canadian Patent 774,054. Preferred high molecular weight materials and resins include polyvinyl butyral, cellulose acetate butyrate, polymethyl methacrylate, poly(vinyl pyrrolidone), ethyl cellulose, polystyrene, polyvinyl chloride, chlorinated rubber, polyisobutylene, butadiene-styrene copolymers, vinyl chloride-vinyl acetate copolymers, copolymers of vinyl acetate, vinyl chloride and maleic acid, polyvinyl alcohol, and high molecular weight ethylene oxide polymers.

The photosensitive and thermosensitive layers and other layers of an element employed in the practice of the invention and described herein can be coated on a wide variety of supports. Typical supports include cellulose nitrate film, cellulose ester film, poly(vinylacetal) film, polystyrene film, poly(ethylene terephthalate) film, polycarbonate film and related films or resinous materials, as well as glass, paper, metal and the like. Typically a flexible support is employed, especially a paper support which can be partially acetylated or coated with baryta and/or an alpha olefin polymer, particularly a polymer of an alpha olefin containing 2 to 10 carbon atoms such as polyethylene, polypropylene, ethylene-butene copolymers and the like.

The photosensitive and thermosensitive and other hardenable layers of an element used in the practice of this invention can be hardened by various organic or inorganic hardeners, alone or in combination, such as aldehydes, and blocked aldehydes, ketones, carboxylic and carbonic acid derivatives, sulfonate esters, sulfonyl halides and vinyl sulfonyl ethers, active halogen compounds, epoxy compounds, aziridines, active olefins, isocyanates, carbodiimides, mixed-function hardeners and polymeric hardeners such as oxidized polysaccharides like dialdehyde starch and oxyguargum and the like.

The photosensitive and thermosensitive elements used in the practice of the invention can contain antistatic or conducting layers. Such layers can comprise soluble salts such as chlorides, nitrates and the like, evaporated metal layers, ionic polymers such as those described in U.S. Pat. 2,861,056 of Minsk issued Nov. 18, 1958 and U.S. Pat. 3,206,312 of Sterman et al. issued Sept. 14, 1965 or insoluble inorganic salts such as those described in U.S. Pat. 3,428,451 of Trevoy issued Feb. 18, 1969. The photosensitive and thermosensitive elements can also contain antihalation materials and antihalation dyes.

The photosensitive and thermosensitive layers or other layers employed in the practice of the invention can contain plasticizers and lubricants. Suitable plasticizers and lubricants include, for example, polyalcohols such as glycerin and diols described, for example, in U.S. Pat. 2,960,404 of Milton et al. issued Nov. 1, 1966; fatty acids or esters such as those described in U.S. Pat. 2,588,765 of Robijns issued Mar. 11, 1952; U.S. Pat. 3,121,060 of Duane issued Feb. 11, 1964; and silicone resins such as those described in British 955,061.

The photosensitive and thermosensitive layers or other layers employed in the practice of the invention can contain surfactants such as saponin; anionic compounds such as alkyl aryl sulfonates described, for example, in U.S. Pat. 2,600,831 of Baldsiefen issued June 17, 1962; amphoteric compounds such as those described in U.S. Pat. 3,133,816 of Ben-Ezra issued May 19, 1964; and adducts of glycidol and an alkyl phenol such as those described in British Pat. 1,022,878.

If desired, the photosensitive and thermosensitive elements employed in the practice of the invention can contain matting agents such as starch, titanium dioxide, zinc oxide, silica, polymeric beads including beads described, for example, in U.S. Pat. 2,922,101 of Jelley et al. issued July 11, 1961 and U.S. Pat. 2,701,245 of Lynn issued Feb. 1, 1955.

The photosensitive and thermosensitive elements employed in the practice of the invention can contain brightening agents including stilbenes, triazines, oxazoles, and coumarin brightening agents. Water-soluble brightening agents can be used such as those described in German Pat. 972,067 and U.S. Pat. 2,933,390 of McFall et al. issued Apr. 19, 1960 or dispersions of brighteners can be used such as those described in German Pat. 1,150,274; U.S. Pat. 3,406,070 of Oetiker et al. issued Oct. 15, 1968 and French Pat. 1,530,244.

The various layers including the photosensitive and thermosensitive layers of an element employed in the practice of the invention can contain light-absorbing materials, filter dyes, antihalation dyes and absorbing dyes such as those described in U.S. Pat. 3,253,921 of Sawdey isssued May 31, 1966; U.S. Pat. 2,274,782 of Gaspar issued Mar. 3, 1942; U.S. Pat. 2,527,583 of Silberstein et al. issued Oct. 31, 1950; and U.S. Pat. 2,956,879 of Van Campen issued Oct. 18, 1960. If desired, the dyes can be mordanted, for example, as described in U.S. Pat. 3,282,699 of Jones et al. issued Nov. 1, 1966.

The photosensitive and thermosensitive layers used in the practice of the invention can be coated by various coating procedures including dip coating, airknife coating, curtain coating or extrusion coating using hoppers such as described in U.S. Pat. 2,681,294 of Beguin issued June 15, 1954. If desired, two or more layers can be coated simultaneously such as by the procedures described in U.S. Pat. 2,761,791 of Russell issued Sept. 4, 1956 and British Pat. 837,095.

If desired, the photosensitive silver halide can be prepared in situ in the photosensitive and thermosensitive coatings of an element employed in the practice of the invention. Such a method is described, for example, in U.S. Pat. 3,457,075 of Morgan et al. issued July 22, 1969. For example, a dilute solution of a halogen acid such as hydrochloric acid can be applied to the surface of a thin coating containing an organic silver salt, such as silver behenate, on a suitable substrate followed by removal of the solvent if desired. Silver halide is thus formed in situ throughout the surface of the coating of the organic silver salt.

The photosensitive silver halide can be prepared on the oxidizing agent such as silver behenate or silver stearate or other organic silver salt prior to application of the silver halide on the support employed. This is also described in U.S. Pat. 3,457,075 of Morgan et al. issued July 22, 1969, for example, a halogen acid such as hydrochloric acid or hydrobromic acid can be mixed with an organic silver salt in a suitable reaction medium. A halide salt more soluble than the organic silver salt can be added to a suspension of the organic silver salt to form the silver halide. A suitable reaction medium includes water or other solutions which do not interfere with the reaction.

Stability to print out upon light exposure is increased by employing highly purified materials; for example, freedom from halides and sulfides increase stability to light exposure. The use of highly purified silver behenate can, for example, reduce light sensitivity of an element according to the invention.

Spectral sensitizing dyes can be used conveniently to confer additional sensitivity to the light-sensitive silver halide employed in the practice of the invention. For instance, additional spectral sensitization can be obtained by treating the silver halide with a solution of a sensitizing dye in an organic solvent or the dye can be added in the form of a dispersion as described in British Pat. 1,154,781. For optimum results the dye can either be added to the emulsion as a final step or at some earlier stage.

Sensitizing dyes useful in sensitizing silver halide emulsions are described, for example, in U.S. Pat. 2,526,632 of Brooker et al. issued Oct. 24, 1950; U.S. Pat. 2,503,776 of Sprague issued Apr. 11, 1950; U.S. Pat. 2,493,748 of Brooker et al. issued Jan. 10, 1950 and U.S. Pat. 3,384,486 of Taber et al. issued May 21, 1968. Spectral sensitizers which can be used include the cyanines, merocyanines, complex (trinuclear or tetranuclear) merocyanines, complex (trinuclear or tetranuclear) cyanines, holopolar cyanines, styryls, hemicyanines such as enamine hemicyanines, oxonols and hemioxonols. Dyes of the cyanine classes can contain such basic nuclei as the thiazolines, oxazolines, pyrrolines, pyridines, oxazoles, thiazoles, selenazoles, and imidazoles. Such nuclei can contain alkyl, alkylene, hydroxyalkyl, sulfoalkyl, carboxylalkyl, aminoalkyl, and enamine groups that can be fused to carbocyclic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei described as well as said acid nuclei such as thiohydantoins, rhodanines, oxazolidenediones, thiazolidenediones, barbituric acids, thiazolineones, and malononitrile. These acid nuclei can be substituted with alkyl, alkene, phenyl, carboxyalkyl, sulfoalkyl, hydroxyalkyl, alkoxyalkyl, alkylamino groups, or heterocyclic nuclei. Combinations of these dyes can be used, if desired. In addition supersensitizing addenda which do not absorb visible light may be included such as, for instance, ascorbic acid derivatives, azaindenes, cadmium salts, and organic sulfonic acid as described in U.S. Pat. 2,933,390 of McFall et al. issued Apr. 19, 1960 and U.S. Pat. 2,937,089 of Jones et al. issued May 17, 1960.

The sensitizing dyes and other addenda used in the practice of the invention can be added from water solutions or suitable organic solvent solutions can be used. The compounds can be added using various procedures including, for example, those described in U.S. Patent 2,912,343 of Collins et al. issued Nov. 10, 1959; U.S. Patent 3,342,605 of McCrossen et al. issued Sept. 19, 1967; U.S. Patent 2,996,287 of Audran issued Aug. 15, 1961; and U.S. Patent 3,425,835 of Johnson et al. issued Feb. 4, 1969.

A range of concentration of dye can be employed in the practice of the invention. The desired concentration will be influenced by the desired spectral sensitivity, other components in the system, the desired image, processing conditions and the like. Typically a concentration of the described sensitizing dye is about 0.05 to about 1 milligram per square foot of the described photosensitive and thermosensitive element, usually about 0.1 milligram per square foot of dye being employed. In elements, as described, typically a support is provided with a lightstable organic silver salt oxidizing agent, an organic reducing agent, and photosensitive silver salt, especially silver halide, which provides a photosensitive and thermosensitive element. A visible image on the photosensitive and thermosensitive element can be produced within a few seconds e.g. about 1 to about 60 seconds, after exposure by heating the element to moderately elevated temperatures, e.g. about 80° to about 250° C.

Accordingly, one embodiment of the invention is a photosensitive and thermosensitive element, as described, (a) Wherein the reducing agent is a bis-naphthol reducing agent, (b) The source of silver for physical development is a silver salt oxidizing agent, (c) The photosensitive silver salt is a photosensitive silver halide, (d) The binder is polyvinyl butyral and (e) An activator-toning agent.

For example, the photosensitive and thermosensitive element as described can comprise (a) Polyvinyl butyral binder, (b) Silver behenate, (c) 2,2′-dihydroxy-1,1′-binaphthyl, (d) Photosensitive silver halide, (e) A sensitizing dye and (f) Phthalimide or N-hydroxyphthalimide activator-toner.

Another embodiment of the invention is a photosensitive and thermosensitive composition comprising (a) an oxidation-reduction image forming combination comprising a bis-naphthol reducing agent and a silver salt oxidizing agent, (b) an activator-toning agent, (c) a binder, and (d) a catalyst for said oxidation-reduction image-forming combination.

A range of concentration of each component in the described element can be employed. The photosensitive and thermosensitive composition can comprise, for example, (a) About 0.4 to about 2.0 moles of 2,2′-dihydroxy-1,1′-binaphthyl per mole of catalyst, (b) About 1.0 to about 3.0 moles of phthalimide or N-hydroxy-phthalimide per mole of catalyst and (c) About 0.01 to about 0.10 mole of photosensitive silver halide per mole of silver behenate oxidizing agent.

After exposure of the described photosensitive and thermosensitive element, the resulting latent image is developed merely by heating the element. Accordingly, another embodiment of the invention is: a process of developing a latent image in an exposed photosensitive and thermosensitive element comprising a support, (a) An oxidation-reduction image forming combination comprising a bis-naphthol reducing agent and a silver salt oxidizing agent, (b) An activator-toning agent, (c) A binder and (d) A catalyst, as described, for the oxidation-reduction image forming combination, comprising heating the described element to about 80° C. to about 250° C. A temperature range of about 125° C. to about 140° C. is usually suitable for developing and stabilizing a desired image. By increasing or decreasing the length of time of heating, a higher or lower temperature within the described range can be employed. A developed image is typically produced within a few seconds, such as about 0.5 second to about 60 seconds.

The photographic process can comprise, for example, exposing to actinic radiation a photosensitive and thermosensitive element comprising a support, (a) an oxidation-reduction image-forming combination comprising a 2,2′-dihydroxy-1,1′-binaphthyl reducing agent and silver behenate, (b) phthalimide or N-hydroxyphthalimide, (c) polyvinyl butyral and (d) photographic silver halide, and heating the described element to about 80° C. to about 250° C. for about 0.5 to about 60 seconds.

Processing is usually carried out under ambient conditions of temperature, pressure and humidity. Temperatures, pressures, and humidity outside normal atmospheric conditions can be employed if desired; however, normal atmospheric conditions are preferred.

In some cases, if desired, an element can be prepared wherein the described silver halide can be in one layer and other components in other layers. For example, an element according to the invention can comprise a support, a layer containing photographic silver halide, and a layer comprising a so-called processing composition comprising (a) a silver salt of an organic acid, (b) a reducing agent, as described, and (c) an activator-toning agent, as described.

An especially suitable processing composition is a photographic processing composition comprising (a) silver behenate, (b) 2,2′-dihydroxy-1,1′-binaphthyl and (c) phthalimide or N-hydroxyphthalimide.

Typically a polyvinyl butyral binder is employed with this processing composition.

As another example, it is sometimes advantageous to incorporate the bis-$\beta$-naphthol reducing agent in a polyvinyl butyral binder and coat the resulting composition as an anti-abrasion overcoat on the element as described previously.

Various methods can be employed in providing the necessary heating of the described photosensitive and thermosensitive elements. The heating means can be a simple hot plate, iron or the like.

Other addenda known to be useful in photosensitive and thermosensitive elements of this type, such as described in British Pat. 1,161,777 published Aug. 20, 1969 and U.S. Pat. 3,152,904 of Sorensen et al., issued Oct. 13, 1964 can be employed in the practice of the invention.

The following examples are included for a further understanding of the invention.

EXAMPLE 1

This illustrates the invention.

A photographic element is prepared as follows:

A coating composition is prepared by mixing the following components:

Silver behenate (about 60–70% pure, impurities present are lower molecular weight fatty acids)—42.0 g.
Behenic acid—32.0 g.
Polyvinyl butyral—15.0 g.
Acetone—250.0 ml.
Toluene—250.0 ml.
Phthalimide—8.5 g.
NaBr (reacts with silver behenate to form silver bromide in situ)—2.4 g.

After ball-mixing for 18 hours, 141 milliliters of the resulting dispersion is combined with the following solutions:

| | Ml. |
|---|---|
| Acetone containing 0.08% by weight 3-ethyl-5-[(3-ethyl - 2(3H) - benzothiazolylidene)isopropylidene]-2-thio-2,4-oxazolidinedione | 4.4 |
| Acetone containing 6.25% by weight 2,2′-dihydroxy-1,1′-binaphthyl | 52.5 |

The composition is mixed and then coated on a water-resistant paper support and dried providing a photosensitive and thermosensitive element containing 60 milligrams of silver per square foot of support. The photosensitive element is exposed sensitometrically with tungsten light for 0.5 second. The resulting latent image is developed by holding the photographic element in contact with a metal block at the following times and temperatures. The resulting images are neutral (jet black) and have a slight pink-brown background.

| Time (sec.) | Temperature (° C.) | $D_{min.}$ | $D_{min.}$ |
|---|---|---|---|
| 15 | 125 | 0.00 | 1.54 |
| 10 | 130 | 0.00 | 1.46 |
| 9 | 135 | 0.02 | 1.35 |
| 6 | 140 | 0.04 | 1.30 |

The developed image is held in room fluorescent light for 14 days at about 20° C. and during that period shows no visible change. The original coatings, prior to exposure and processing, show good incubation stability even after about 3 days at about 49° C. and about 35 percent relative humidity. Only a relatively slight loss in speed and a 4 percent maximum density loss with no increase in minimum density is observed after incubation, exposure and dry processing with heat as described.

EXAMPLE 2

This is a comparative example.

The procedure set out in Example 1 is repeated with the exception that phthalimide is omitted from the described photosensitive and thermosensitive element. The element is exposed sensitometrically with tungsten light for 0.5 second and heated for 15 seconds at 125° C. The resulting image is extremely faint and is orange-red in color.

This demonstrates the activator-toning characteristics of phthalimide according to the invention.

EXAMPLE 3

This is a comparative example.

The procedure set out in Example 1 is repeated with the exception that phthalimide and the sensitizing dye are omitted from the described photosensitive and thermosensitive element and 2 cc. of an acetone solution containing 3% by weight 2,3-dihydroxynaphthalene is added to the dispersion. The element is exposed sensitometrically with tungsten light for 2 seconds and heated for 15 seconds at 125° C. The resulting image is greenish-black with a pink background. This demonstrates that a more reactive reducing agent in addition to 2,2'-dihydroxy-1,1'-binaphthyl can produce an image in the absence of an activator-toning agent.

EXAMPLE 4

This is a comparative example.

The procedure set out in Example 1 is repeated with the exception that an equimolar concentration of 2,2'-methylene-bis-(4-methyl-6-t-butylphenol) is employed in place of 2,2'-dihydroxy-1,1'-binaphthyl. Samples of the coating are exposed and heat processed for 20 seconds at 90° C. This provides a light-gray image which has a maximum density of 0.56 and a minimum density of 0.02 with a pink background.

This demonstrates that in the described element, 2,2'-dihydroxy-1,1'-binaphthyl is a more active reducing agent than 2,2'-methylene-bis-(4-methyl-6-t-butylphenol).

EXAMPLE 5

This is a comparative example.

The procedure set out in Example 1 is repeated with the exception that an equimolar concentration of 2,2'-methylene-bis-(4-methyl-6-t-butylphenol) is employed in place of 2,2'-dihydroxy-1,1'-binaphthyl and 2.2 moles of 1-(2H)-phthalazinone per mole of silver bromide is employed in place of 2.9 moles phthalimide per mole of silver bromide. Samples of the coating are exposed and heat processed for 11 seconds at 90° C. The resulting image is brownish-black with a gray background and has a maximum density of 0.98 with a minimum density of 0.01. An 11 percent loss in maximum density is observed after incubation of these coatings at 49° C. for 3 days at 35 percent relative humidity, exposure and dry processing with heat.

EXAMPLE 6

This is a comparative example.

The procedure set out in Example 1 is repeated with the exception that 1.4 moles of 1-(2H)-phthalazinone per mole of silver bromide is employed in place of 2.9 moles of phthalimide per mole of silver bromide. Samples of the coating are exposed and processed for 5 seconds at 135° C. The resulting image is dark-black with a brownish-gray background and has a maximum density of 1.51 with a minimum density of 0.04.

This demonstrates the utility of 2,2'-dihydroxy-1,1'-binaphthyl as a reducing agent with another activator-toning agent.

EXAMPLE 7

This illustrates the invention.

The procedure set out in Example 1 is repeated with the exception that 1.9 moles of N-hydroxyphthalimide per mole of silver bromide is substituted for 2.9 moles of phthalimide per mole of silver bromide. Samples of the coating are exposed and processed for 10 seconds at 135° C. The resulting image is dark black with a yellow background and has a maximum density of 1.45 and a minimum density of 0.16.

EXAMPLE 8

This illustrates the invention.

The procedure set out in Example 1 is repeated with the exception that 1.8 moles of the potassium salt of phthalimide per mole of silver bromide is substituted for 2.9 moles of phthalimide per mole of silver bromide. Samples of the coating are exposed for 0.5 second and processed for 10 seconds at 135° C. The resulting image is black with a pink background and has a maximum density of 1.24 with a minimum density of 0.14.

EXAMPLE 9

This illustrates the invention.

The procedure set out in Example 1 is repeated with the exception that 2.2 moles of succinimide per mole of silver bromide is substituted for 2.9 moles of phthalimide per mole of silver bromide. Samples of the coating are exposed for 0.5 second and processed for 15 seconds at 130° C. The resulting image is dark-green in color with a tan background and has a maximum density of 0.98 and a minimum density of 0.02.

EXAMPLE 10

This illustrates the invention.

The procedure set out in Example 1 is followed with the exception that 2.8 moles of N-hydroxysuccinimide per mole of silver bromide is substituted for 2.9 moles of phthalimide per mole of silver bromide. Samples of the coating are exposed for 0.5 second and processed for 10 seconds at 135° C. The resulting image is grayish-black with an orange-brown background and has a maximum density of 1.10 and a minimum density of 0.10.

EXAMPLE 11

Similar results are obtained as in Example 1 also employing 6,6'-dibromo-2,2-dihydroxy-1,1'-binaphthyl, as a reducing agent, in the described element.

EXAMPLE 12

Similar results are obtained as in Example 1 also employing bis-(2-hydroxy-1-naphthyl)methane, as a reducing agent, in the described element.

EXAMPLE 13

Similar results are obtained as in Example 1 also employing the silver salt of phthalimide, as an activator-toning agent, in the described element.

EXAMPLE 14

Similar results are obtained as in Example 1 also employing the mercury salt of phthalimide, as an activator-toning agent, in the described element.

The invention has been described in detail with particular reference to preferred embodiments thereof, but it will be understood that variations and modifications can be effected within the spirit and scope of the invention.

I claim:

1. A photosensitive and thermosensitive element comprising a support,
 (a) an oxidation-reduction image-forming combination comprising (i) a bis-beta-naphthol reducing agent and (ii) a silver salt oxidizing agent,
 (b) a binder, and
 (c) a catalyst, for said oxidation-reduction image-forming combination, comprising a photosensitive silver salt.

2. A photosensitive and thermosensitive element as in claim 1 comprising an activator-toning agent.

3. A photosensitive and thermosensitive element as in claim 1 comprising an activator-toning agent which is a cyclic imide.

4. A photosensitive and thermosensitive element as in claim 1 comprising an activator-toning agent which comprises phthalimide or N-hydroxyphthalimide.

5. A photosensitive and thermosensitive element as in claim 1 wherein said bis-beta-naphthol reducing agent is 2,2'-dihydroxy-1,1'-binaphthyl.

6. A photosensitive and thermosensitive element as in claim 1 wherein said catalyst is photographic silver halide.

7. A photosensitive and thermosensitive element as in claim 1 comprising about 0.4 to about 2.0 moles of said bis-beta-naphthol reducing agent per mole of said catalyst, about 1.0 to about 3.0 moles of an activator-toning agent per mole of said catalyst and about 0.01 to about 0.10 mole of said catalyst per mole of said silver salt oxidizing agent.

8. A photosensitive and thermosensitive element as in claim 1 comprising a support,
 (a) an oxidation-reduction image forming combination comprising (i) 2,2'-dihydroxy-1,1'-binaphthyl and (ii) silver behenate,
 (b) phthalimide or N-hydroxyphthalimide,
 (c) polyvinyl butyral, and
 (d) photographic silver halide.

9. A photosensitive and thermosensitive composition comprising
 (a) an oxidation-reduction image forming combination comprising (i) a bis-beta-naphthol reducing agent and (ii) a silver salt oxidizing agent,
 (b) an activator-toning agent,
 (c) a binder, and
 (d) a catalyst, for said oxidation-reduction image forming combination, comprising a photosensitive silver salt.

10. A photosensitive and thermosensitive composition as in claim 9 comprising about 0.4 to about 2.0 moles of said bis-beta-naphthol reducing agent per mole of said catalyst, about 1.0 to about 3.0 moles of said activator-toning agent per mole of said catalyst, and about 0.01 to about 0.50 mole of said catalyst per mole of said silver salt oxidizing agent.

11. A photosensitive and thermosensitive composition as in claim 9 comprising
 (a) an oxidation-reduction image forming combination comprising (i) 2,2'-dihydroxy-1,1'-binaphthyl and (ii) silver behenate,
 (b) phthalimide or N-hydroxyphthalimide,
 (c) polyvinyl butyral, and
 (d) photographic silver halide.

12. A process of developing a latent image in an exposed photosensitive and thermosensitive element comprising a support,
 (a) an oxidation-reduction image forming combination comprising (i) a bis-beta-naphthol reducing agent and (ii) a silver salt oxidizing agent,
 (b) an activator-toning agent,
 (c) a binder, and
 (d) a catalyst, for said oxidation-reduction image forming combination, comprising a photosensitive silver salt, comprising heating said element to about 80° C. to about 250° C.

13. A process of developing a latent image as in claim 12 wherein said photosensitive and thermosensitive element is heated to about 80° C. to about 250° C. for about 0.5 to about 60 seconds.

14. A photographic process comprising exposing to actinic radiation a photosensitive and thermosensitive element comprising a support,
 (a) an oxidation-reduction image forming combination comprising (i) 2,2'-dihydroxy-1,1'-binaphthyl and (ii) silver behenate,
 (b) phthalimide or N-hydroxyphthalimide,
 (c) polyvinyl butyral, and
 (d) photographic silver halide, and heating said element to about 80° C. to about 250° C. for about 0.5 to about 60 seconds.

References Cited

UNITED STATES PATENTS

| | | | |
|---|---|---|---|
| 3,080,254 | 3/1963 | Grant | 117—36.8 |
| 3,094,417 | 6/1963 | Workman | 96—28 |
| 3,094,619 | 6/1963 | Grant | 117—36.8 |
| 3,152,904 | 10/1964 | Sorensen | 96—76 |
| 3,180,731 | 4/1965 | Roman | 96—67 |
| 3,322,557 | 5/1967 | Schwab | 117—36.8 |
| 3,438,776 | 4/1969 | Yudelson | 96—95 |
| 3,457,075 | 7/1969 | Morgan | 96—114.1 |

FOREIGN PATENTS

| | | |
|---|---|---|
| 1,131,108 | 10/1968 | Great Britain. |

NORMAN G. TORCHIN, Primary Examiner

J. R. HIGHTOWER, Assistant Examiner

U.S. Cl. X.R.

117—36.8; 250—65.1